United States Patent [19]

Auerbach et al.

[11] 4,120,836

[45] Oct. 17, 1978

[54] PROCESS FOR PREPARING SHAPED CELLULOSE ACETATE ARTICLE

[75] Inventors: Andrew B. Auerbach, Livingston; John P. Thelman, Kenvil; Albin F. Turbak, Convent Station, all of N.J.

[73] Assignee: International Telephone and Telegraph Corporation, New York, N.Y.

[21] Appl. No.: 833,076

[22] Filed: Sep. 14, 1977

[51] Int. Cl.$^2$ .............................................. C08L 1/12
[52] U.S. Cl. .................................. 260/15; 264/177 F; 264/200
[58] Field of Search ............... 260/15; 264/200, 177 F

[56] References Cited

U.S. PATENT DOCUMENTS

| | | | |
|---|---|---|---|
| 3,839,527 | 1/1974 | Turbak et al. | 264/200 |
| 3,839,528 | 1/1974 | Turbak et al. | 264/200 |

*Primary Examiner*—Edward M. Woodberry
*Attorney, Agent, or Firm*—James B. Raden; Harold J. Holt

[57] ABSTRACT

The evolution of formaldehyde from shaped cellulose acetayte articles containing methylolated melamine or guanamine polymers is reduced by adding to the solutions from which the cellulose acetate article is regenerated, from 1 to 20% by weight based on the weight of the methylolated polymer of a cyclic urea compound.

6 Claims, No Drawings

PROCESS FOR PREPARING SHAPED CELLULOSE ACETATE ARTICLE

This invention relates to a process for preparing a polymer-modified cellulose acetate shaped article and more specifically to such a process in which the evolution of formaldehyde is suppressed.

U.S. Pat. Nos. 3,839,527 and 3,839,528, dated Oct. 1, 1974 and assigned to the present assignee, disclose cellulose acetate fibers of improved dimensional stability and solvent resistance. The fibers are prepared from cellulose acetate solutions containing certain capped melamine-formaldehyde or guanamine-formaldehyde polymers which, upon the application of heat, react with and crosslink the cellulose acetate fiber or fabric. A processing difficulty involved with the incorporation of such polymers with cellulose acetate solutions is the evolution of formaldehyde during knitting, dyeing, curing or even storing operations. The evolution of formaldehyde is objectionable from an environmental standpoint.

Formaldehyde scavengers or suppressants have been disclosed which prevent or reduce the presence of free formaldehyde used in finishing or coating solutions. For example, Reid, Kullman and Reinhardt in American Dyestuff Reporter, Vol. 59, No. 6, pages 26–34, June, 1970 report the results of the addition of a number of compounds on the formaldehyde content or carbamate finishing solutions. One of the compounds tested, ethylene urea, was found to significantly reduce free formaldehyde but it also was found to reduce the resistance to bleaching of cotton fabrics treated with the resulting solutions. The low resistance of ethylene urea to chlorine damage severely limits the utility of this method of formaldehyde suppression to those fibers which are not subjected to bleaching. U.S. Pat. No. 3,859,334, dated Jan. 7, 1975, indicates that this undesirable side effect may be eliminated by the use of the compound phthalimide, which forms an insoluble adduct with the formaldehyde which may be subsequently removed from the finishing agent before application to the fiber or fabric.

The foregoing prior art has dealt with the problems involved in the release of formaldehyde from the surface of cloth treated with finishing agents. Where the formaldehyde containing modifying agent is actually incorporated in the fiber the problems are considerably greater. In the aforementioned U.S. Pat. Nos. 3,839,527 and 3,839,528, a methylolated polymer is added to an acetone solution of cellulose acetate prior to spinning and regeneration of the fiber. Certain of the known formaldehyde scavengers, including ethylene urea, are only slightly soluble in acetone and hence would not appear to be useful for scavenging formaldehyde. In addition, the removal of insoluble adducts of the formaldehyde scavenger is rendered quite difficult where the adduct is incorporated in the fiber. Further, because any formaldehyde suppressant remains and becomes a part of the fiber, the suppressant must not have an adverse effect on fiber properties nor interfere with cure of the fiber.

It is accordingly a primary object of the present invention to provide a process for reducing the solution of formaldehyde from shaped cellulose acetate products containing a methylolated polymer.

It is an additional object of this invention to suppress formaldehyde evolution from such cellulose acetate products without interfering with the cure of the fibers or their ability to resist bleaching and without adverse affect on the fiber properties.

It is an additional object of this invention to provide a class of compounds which effectively eliminates formaldehyde evolution when added in very small proportions to cellulose acetate solutions.

The foregoing and other objects of the invention are accomplished by the addition to the cellulose acetate solution from which the shaped article is regenerated of from 1 to 20% by weight, based on the weight of the methylolated polymer, of a cyclic urea compound. The cellulose acetate solutions to which the invention is directed are those comprising cellulose acetate containing free hydroxyl groups, an acetone solvent and an acetone-soluble methylolated melamine or guanamine polymer having a degree of polymerization of between 2 and 10. It has been found that the cyclic ureas, and particularly ethylene urea, not only effectively suppress formaldehyde evolution during processing of the cellulose acetate fiber or other shaped article but also do so without interfering with cure of the polymer and without adverse side affect on product properties including resistance to laundering and bleaching. The invention thus obviates the need for costly equipment or special processing methods to avoid formaldehyde vapor pollution during knitting or finishing operations or final cure of the shaped article. The invention is particularly unexpected in that it is effective in spite of the very low solubility of the cyclic urea in acetate solutions and because of the apparent lack of any detrimental affect on the bleach resistance of the fabric.

The invention is illustrated by the following examples in which all parts and percentages are by weight unless otherwise indicated.

EXAMPLE 1

A solution was prepared by dissolving 896 grams of cellulose acetate (800 oven dry, 39.7% acetyl) in 3224 ml of acetone. Total solution water content was adjusted to 2%. mixing was accomplished using a helical mixer over a 16-hour period. To this solution 100 grams of a methyl capped methylol melamine polymer and 20 grams of ethylene urea were added in 100 ml of acetone. The capped methylol polymer was prepared from 3.2 moles of formaldehyde for each mole of melamine with approximately 2 moles of methanol used in capping. The polymer has a degree of polymerization of 2, an approximate molecular weight of 380, is 72% alkylated with methyl groups and contains 28% free methylol groups. After addition of the polymer and ethylene urea, the resulting solution was stirred for an additional 4 hours prior to a double stage pressure filtration. The solution was then deaerated on standing for 12 hours. The resulting acetone spin dope was then spun through a 40 hole (0.06 mm) spinnerette at a head pressure of 300-400 psig with a head temperature of 60–70° C. Jetting rate was approximately 30 ml/min. with a takeup of 1030 linear feet/minute. This yielded a stretch of 14%. Cell jacket temperature was maintained at 110° C. during spinning. The resultant 175 denier acetate yarn was twisted to 2.5 turns/inch and evaluated. Properties of this yarn are shown in Table I.

EXAMPLE 2

Example 1 was repeated with a solution containing 917 grams of cellulose acetate, 100 grams of the same capped methylol melamine polymer and 10 grams of ethylene urea in 3241 ml of acetone. Properties of the yarn are also shown in Table 1.

EXAMPLE 3

Example 1 was again repeated with a solution containing 915 grams of cellulose acetate, 100 grams of the methyl capped melamine polymer and 5 grams of ethylene urea in 3197 ml of acetone. Properties of this yarn are also shown in Table 1.

EXAMPLE 4

Example 1 was repeated with a solution containing 896 grams of cellulose acetate, 100 grams of a capped benzoguanamineformaldehyde polymer and 20 grams of ethylene urea in 3224 ml of acetone. The benzoguanamine polymer had a degree of polymerization of 4, an approximate molecular weight of 1200, was 55% alkylated with butyl groups and contained 45% free methylol groups. The properties of this yarn are also shown in Table I.

EXAMPLE 5

Example 1 was repeated with a solution containing 896 grams of cellulose acetate, 100 grams of a butyl capped methylol melamine polymer and 20 grams of ethylene urea in 3224 ml of acetone. The melamine polymer had a degree of polymerization of 4, an approximate molecular weight of 1200, was 35% alkylated with butyl groups and contained 65% free methylol groups. Properties of this yarn are also shown in Table I.

In Table I, Examples 1–5 contain the ethylene urea additive. Examples 6–8 are identically prepared control yarns containing no additive. The yarns were evaluated for formaldehyde evolution by a test method of the American Association of Textile Chemists and Colorists (AATCC Test Method 112-1975) which involves suspending in a jar a one gram sample over 50 ml of distilled water and heating the jar at 49° C. ± 1° C. for 20 hours. The resulting water solution is analyzed colorimetrically for free formaldehyde. The results of the presence of the ethylene urea additive on formaldehyde evolution, as compared with the control samples is shown in Table I. Table I also shows the resistance to bleaching of the yarns of Examples 1-8. Bleaching experiments were performed using AATCC Method No. 92-1974 in which knit socks for these yarns were prewet in deionized water at 71° C. for 3 minutes, then subjected to a chlorination solution at 25° C. for 15 minutes, and then rinsed with deionized water at room temperature for 2 minutes. The samples were then air dryed, conditioned and half the sample was scorched at 185° C. ± 1° C. Tensile strengths were measured on a Mullen tester for both the control and scorched fabric. The results are set forth in Table I.

EXAMPLE 9

A series of spinning solutions were prepared containing 27.7 percent cellulose acetate flake in acetone and 10%, based on the weight of total solids, of the capped methylol melamine polymer of Example 1. A control solution was prepared without additive. The remaining solution samples contained 2% by weight of the total solids of ethylene urea or of a known formaldehyde scavenger outside the scope of the invention. The resulting 175 denier yarns were then evaluated, as in Table I, for formaldehyde evolution by AATCC Method 112-1975. The results are set forth in Table II.

TABLE II

| Additive | Formaldehyde (ppm) |
|---|---|
| Ethylene Urea | 30 |
| Phthalimide | 175 |
| Urea | 160 |
| Polyurethane[1] | 180 |
| Isopropyl Carbamate | 165 |
| Control | 240 |

[1]Sold under the trademark Estane 5716.

These data clearly demonstrate the superiority of ethylene urea used in accordance with the teachings of the present invention as compared with other scavengers of the type used in resin coating applications.

The cyclic ureas useful in the invention should have a solubility in acetone of at least 1%. Ethylene urea which has a solubility in acetone of about 2%, is the preferred cyclic urea but other cyclic ureas may be used, for example, the hydrocarbon substituted ethylene ureas, such as N-methyl ethylene ureas, in which a hydrogen or one of the cyclic carbon or nitrogen atoms is replaced by an alkyl group such as methyl, ethyl or propyl. Acyclic ureas such as urea itself, diethylene urea or hydroxy ethyl urea provide inadequate formaldehyde suppression, are insoluble in acetone or both and thus are not useful in the invention.

The cellulose acetate should be a diacetate having free hydroxyl groups and a degree of substitution of acetyl groups of from 2.05 to 2.77 or from 35.5% to 42.8% acetyl groups based on the weight of cellulose acetate. The methylol melamine polymers are preferably those shown in U.S. Pat. No. 3,839,528 and the guanamine polymers those shown in U.S. Pat. No. 3,839,527, the specifications of both of which patents are hereby incorporated by reference. As shown in these patents the melamine and guanamine polymers have at least one

TABLE I

| Ex. No. | Resin | Additive | Concentration (% of Solids) | Formaldehyde (ppm) | Heat Set[1] Tenacity (g/denier) Dry | Heat Set[1] Tenacity (g/denier) Wet | Heat Set[1] Elongation (percent) Dry | Heat Set[1] Elongation (percent) Wet | Bleaching Resistance Fabric Strength (kilo pascals) Control | Bleaching Resistance Fabric Strength (kilo pascals) Scorched |
|---|---|---|---|---|---|---|---|---|---|---|
| 1 | Methyl capped melamine | Ethylene Urea | 2 | 30 | 1.34 | 0.74 | 21.3 | 27.6 | 305 | 305 |
| 2 | Methyl capped melamine | Ethylene Urea | 1 | 45 | 1.38 | 0.79 | 17.4 | 19.6 | 275 | 315 |
| 3 | Methyl capped melamine | Ethylene Urea | 0.5 | 120 | 1.34 | 0.76 | 21.3 | 21.9 | 320 | 355 |
| 4 | Butyl capped Benzoquanamine | Ethylene Urea | 2 | 30 | 1.43 | 0.83 | 26.6 | 30.5 | | |
| 5 | Butyl capped melamine | Ethylene Urea | 2 | 50 | 1.47 | 0.83 | 23.9 | 32.0 | 350 | 365 |
| 6 | Methyl capped melamine | Control | — | 240 | 1.38 | 0.79 | 22.4 | 22.5 | 245 | 320 |
| 7 | Butyl capped Benzoquanamine | Control | — | 180 | 1.49 | 0.87 | 29.9 | 28.7 | | |
| 8 | Butyl capped melamine | Control | — | 180 | 1.38 | 0.84 | 28.1 | 31.6 | 350 | 355 |

[1]175° C. - 30 minutes.

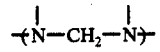

linkage between melamine or guanamine molecules, a degree of polymerization of between 2 and 10 and between 30 and 80% of its free methylol groups alkylated with a 1 to 4 carbon alkyl group. Solutions of these polymers and cellulose acetate do not require acid for cure and thus have a pH within the optimum range of 6 to 8 for effectiveness of the cyclic ureas for formaldehyde suppression. The invention is useful in the production of both fibers spun from the foregoing cellulose acetate solutions or in other shaped products such as cast films. After production of the shaped product, the product is heat set to crosslink and react the cellulose acetate-polymer in fiber, fabric or film form. The temperature and times of heat setting generally range from 150° C. to 250° C. for from a few seconds to an hour or more. The cross-linking provides a cellulose acetate product of improved dimensional stability and solvent resistance.

We claim:

1. In a process for preparing a cellulose acetate shaped article comprising mixing a solution of cellulose diacetate containing free hydroxyl groups with an acetone solvent, said solution containing an acetone-soluble methylolated polymer selected from the group consisting of melamine and quanamine polymers having a degree of polymerization between 2 and 10, and regenerating a shaped article from said solution, the improvement comprising adding to said solution from 1 to 20% by weight based on the weight of the methylolated polymer of a cyclic area compound selected from the group consisting of ethylene urea and hydrocarbon substituted ethylene ureas.

2. The process of claim 1 in which the cyclic urea is ethylene urea.

3. The process of claim 1 in which the methylolated polymer is a melamine polymer having at least one

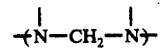

linkage between melamine molecules and between 30 and 80% of its free methylol groups alkylated with a 1 to 4 carbon alkyl group.

4. The process of claim 1 in which the methylolated polymer is a guanamine polymer having at least one

linkage between guanamine molecules and between 30 and 80% of its free methylol groups alkylated with a 1 to 4 carbon alkyl group.

5. The process of claim 1 in which the shaped article is a fiber spun from the cellulose acetate solution.

6. The process of claim 1 in which the shaped article is heat set and cured subsequent to regeneration.

* * * * *